US006185699B1

(12) United States Patent
Haderle et al.

(10) Patent No.: US 6,185,699 B1
(45) Date of Patent: Feb. 6, 2001

(54) METHOD AND APPARATUS PROVIDING SYSTEM AVAILABILITY DURING DBMS RESTART RECOVERY

(75) Inventors: Donald J. Haderle, Los Gatos; Julie Ann Watts, Morgan Hill, both of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/003,085

(22) Filed: Jan. 5, 1998

(51) Int. Cl.$^7$ .................................................. G06F 11/00
(52) U.S. Cl. ................................. 714/19; 714/2
(58) Field of Search ................................ 714/2, 16, 19

(56) References Cited

U.S. PATENT DOCUMENTS

| | | | |
|---|---|---|---|
| 4,674,038 | 6/1987 | Brelsford et al. | 364/200 |
| 5,155,678 | 10/1992 | Fukumoto et al. | 395/425 |
| 5,317,739 | 5/1994 | Elko et al. | 395/650 |
| 5,333,303 | 7/1994 | Mohan | 395/575 |
| 5,386,559 | 1/1995 | Eisenberg et al. | 395/600 |
| 5,421,006 | 5/1995 | Jablon et al. | 395/575 |
| 5,455,944 | 10/1995 | Haderle et al. | 395/600 |
| 5,530,855 | 6/1996 | Satoh et al. | 395/600 |
| 5,561,798 | 10/1996 | Haderle et al. | 395/600 |
| 5,574,902 | 11/1996 | Josten et al. | 395/601 |
| 5,581,750 | 12/1996 | Haderle et al. | 395/618 |
| 5,596,710 | 1/1997 | Voigt | 395/182.17 |
| 5,640,561 | 6/1997 | Satoh et al. | 395/618 |

OTHER PUBLICATIONS

"Asynchronous Recovery and Reliability for a Multiuser Database System", S. Sadjadi, et al. *IBM—Technical Disclosure Bulletin*, 34–10B, Mar. 1992.
"Scheme for Reduced Logging for Forward–Recoverable Databases", D. Bezviner, et al. *IBM—Technical Disclosure Bulletin*, 37–05, May 1994.
"Object Relocation File Recovery" *IBM—Technical Disclosure Bulletin*, 35–4B, Sep. 1992.

C. Mohan, "A Cost–Effective Method for Providing Improved Data Availability During DBMS Restart Recovery After a Failure", 19th International Conference on Very Large Data Bases, Proceedings, pp. 368–379, Published: Palo Alto, CA, USA, 1993.
C. Mohan, et al. "Recovery and Coherency–Control Protocols for Fast Intersystem Page Transfer and Fine–Granularity Locking in a Shared Disks Transaction Environment", 17th International Conference on Very Large Data Bases, Proceedings, pp. 193–207, Published: San Mateo, CA, USA, 1991.
S. Son, "Recovery in Main Memory Database Systems for Engineering Design Applications", Dept. of Comput. Sci., Virginia Univ., Information and Software Technology, vol. 31, No. 2, pp. 85–90, Mar. 1989.
Crus, R., "Data Recovery in IBM Database 2", IBM Systems Journal, vol. 23, No. 2, pp. 178–188, 1984.
JSM Verhofstad, "Recovery Techniques for Database Systems" BNSR, Toronto, Ont., Canada, Computing Surveys, vol. 10, No. 2, pp. 167–195, Jun. 1978.
J. Johnston, "Restart and Recovery in Online Systems", Real–Time Software: Internation State of the Art Report, pp. 701–720, Published: Maidenhead, Berks., UK, 1976.

*Primary Examiner*—David A Wiley
(74) *Attorney, Agent, or Firm*—Sawyer Law Group LLP; Ingrid M. Foerster

(57) ABSTRACT

A method and apparatus to provide DBMS restart recovery that allows transactions to access data that does not have restart recovery work pending. Access to data requiring restart recovery work to be performed is restricted, and a transaction is denied access to this data. In another embodiment, the invention allows certain transactions to access restricted data that has restart recovery work pending. These transactions are transactions that do not require data consistency. Regardless of the embodiment, the invention allows full recovery to be completed concurrent to the processing of new transactions requiring access to the database. An amount of restart recovery processing may be postponed until after the DBMS has begun accepting new work requests.

21 Claims, 6 Drawing Sheets

METHOD AND APPARATUS PROVIDING SYSTEM AVAILABILITY DURING DBMS RESTART RECOVERY

BACKGROUND OF THE INVENTION

1. Field of the Invention

The present invention relates generally to data recovery in data processing systems employing a database. More particularly, the present invention relates to a method and apparatus for providing processing system availability during database management system restart recovery without loss of data integrity.

2. Description of the Related Art

Data processing systems typically manage large amounts of customer data and data generated by users within the data processing system. For many businesses, any loss in the ability to access data severely impacts the success of the business. Indeed, it is deemed catastrophic if the data is unavailable for a prolonged period of time. Thus, when system failures occur, the system must restart rapidly to minimize data outage.

Much business data is stored in databases, under the management of a database management system (DBMS). When a DBMS is restarted after system failure, part of the DBMS's restart function is to attend to work that was interrupted by the failure. This function is typically called restart recovery. It involves ensuring that committed work is not lost as a result of the failure, and ensuring that uncommitted work that persists the failure is undone.

In DBMSs that employ write-ahead logging (WAL), committed transactions are typically recovered by performing REDO (forward) processing of the log during restart recovery: uncommitted transactions are backed out by performing an UNDO (backward) processing of the recovery log. A further discussion of write-ahead logging, UNDO, REDO and other commonly known recovery methods may be found in U.S. Pat. No. 5,333,303 issued Jul. 26, 1994, entitled, "METHOD FOR PROVIDING DATA AVAILABILITY IN A TRANSACTION-ORIENTED SYSTEM DURING RESTART AFTER A FAILURE," assigned to the assignee of the current invention and incorporated herein, and in the following references:

1. C. J. Date, "AN INTRODUCTION TO DATABASE SYSTEM", Vol. 1, Fourth Edition, Addison Wesley Publishing Company, Copyright 1986, Chapter 18;
2. H. F. Korth et al., "DATABASE SYSTEM CONCEPTS", McGraw-Hill Book Company, Copyright 1986, Chapter 10;
3. C. Mohan et al., "ARIES: A TRANSACTION RECOVERY METHOD SUPPORTING FINE-GRANULARITY LOCKING AND PARTIAL ROLL-BACKS USING WRITE-AHEAD LOGGING", IBM Research Report R J 6649 (63960), Jan. 23, 1989, Revised Nov. 2, 1990;
4. C. Mohan, "COMMIT_LSN: A NOVEL AND SIMPLE METHOD FOR REDUCING LOCKING AND LATCHING IN TRANSACTION PROCESSING SYSTEM", Proceedings of the Sixteenth VLDB Conference, August 1990; and
5. C. Mohan et al., "TRANSACTION MANAGEMENT IN THE R* DISTRIBUTED DATABASE MANAGEMENT SYSTEM", ACM transactions on Database Systems, Vol 11, No. 4, December 1986, pgs. 378–396.

DBMSs that do not use WAL typically employ force-at-commit protocols. In these systems, the result of work completed is held in cache and the resultant data is not updated until the work has been fully committed. With force-at-commit systems, it is not necessary to perform REDO processing; UNDO processing is sufficient.

In both WAL and non-WAL systems, a DBMS's restart recovery processing can take a considerable amount of time. This is especially true if one or more long-running transactions were active at the time of failure. This is because the operations performed by the transactions must be backed out and prior art DBMSs do not traditionally start to process new transactions until all data recovery processing has been completed. Hence the data outage can be large.

What is needed is a method and apparatus for performing a DBMS restart recovery with partially delayed UNDO processing that provides processing system availability. The method would allow a portion of the restart recovery to be postponed until after the DBMS involved begins accepting new work (transactions). Further, the method and apparatus should ensure data consistency during recovery, where required, to preserve data integrity.

SUMMARY OF THE INVENTION

Broadly, the present invention concerns a method and apparatus that provides processing system availability during DBMS restart recovery while maintaining data consistency. The invention delays at least part of the recovery processing until after the DBMS has begun accepting new work.

In one embodiment, the invention may be implemented to provide a method of DBMS restart recovery that allows transactions to access data that does not have restart recovery work pending. Access to data having pending restart recovery work is restricted, and a transaction is denied access to this data. In another embodiment, the inventive method allows certain transactions to access restricted data that has restart recovery work pending. These transactions are transactions that do not require data consistency. Regardless of the embodiment, the invention allows full recovery to be completed concurrent to data transaction processing that requires access to the database data. An amount of restart recovery processing may be postponed until after the DBMS has begun accepting new work requests.

In another embodiment, the invention may be implemented to provide an apparatus that provides a method of DBMS restart recovery that allows transactions to access the data being recovered. The apparatus may include a processor, storage, a user interface with or without a graphic interface, and other digital data processing components commonly found in such digital processing systems.

In still another embodiment, the invention may be implemented to provide an article of manufacture comprising a data storage device tangibly embodying a program of machine-readable instructions executable by a digital data processing apparatus to perform method steps for DBMS restart recovery that allows transactions to access data that does not have restart recovery work pending as described below. As mentioned above, the method steps allow postponement of the restart recovery of the data until after the DBMS begins accepting new work.

The invention affords its users with a number of distinct advantages. One advantage the invention provides is a way to recover data in a processing system concurrent to allowing transactions to access data so that the system can be restarted and system "down time" reduced. Another advantage is that transactions requiring data consistency are denied access to restricted data, that is, data that has restart recovery work pending. Still a further example is that the invention allows transactions not requiring data consistency to access restricted data.

The invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

One aspect of the invention concerns an apparatus 100 for restarting shared databases, and may be embodied by various hardware components and interconnections, one of which is illustrated in FIG. 1.

Figure 1A:
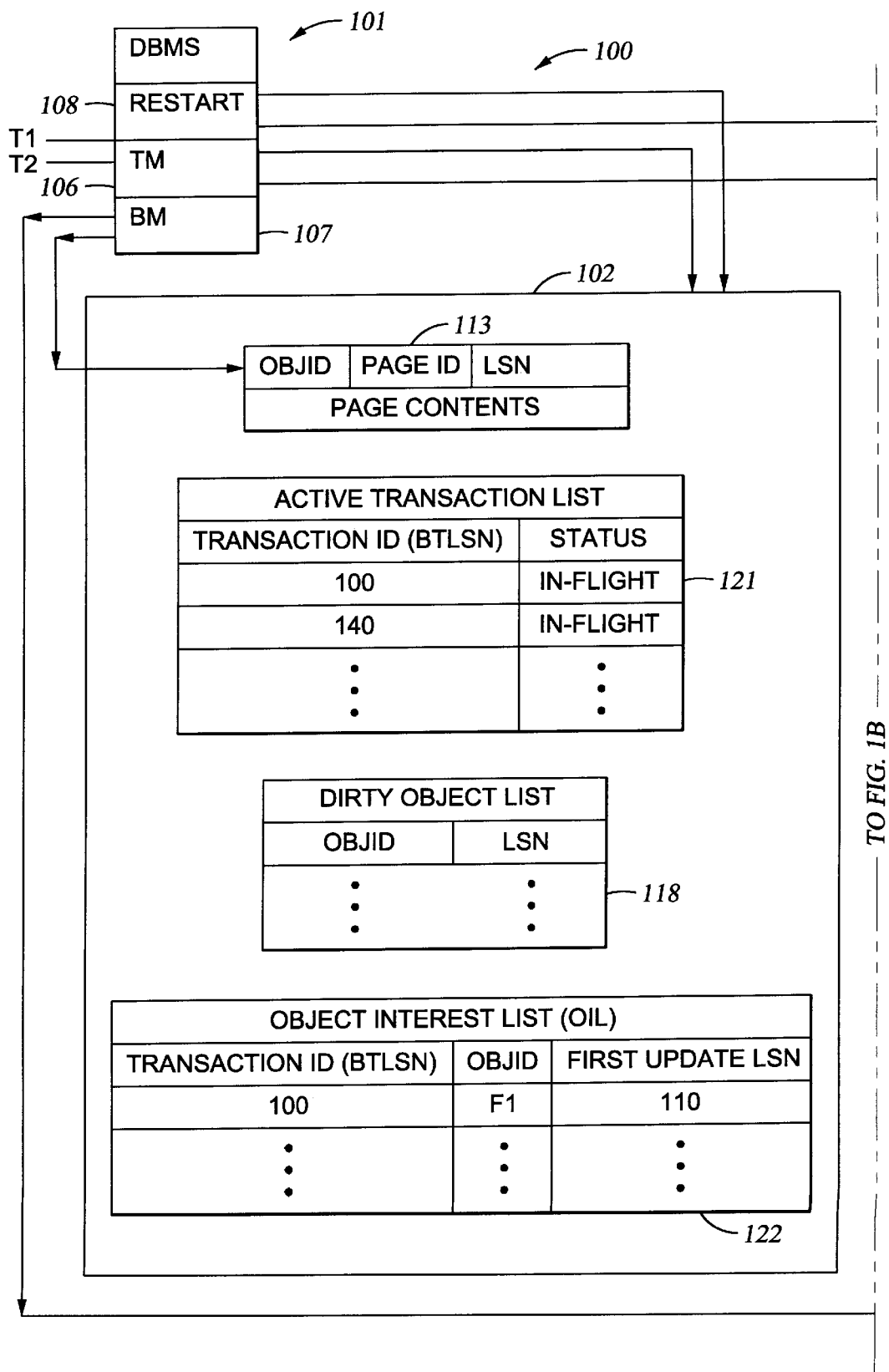
FIG. 1A and 1B depict a block diagram of a data processing system incorporating a DBMS in accordance with one embodiment of the present invention.
Figure 1B:
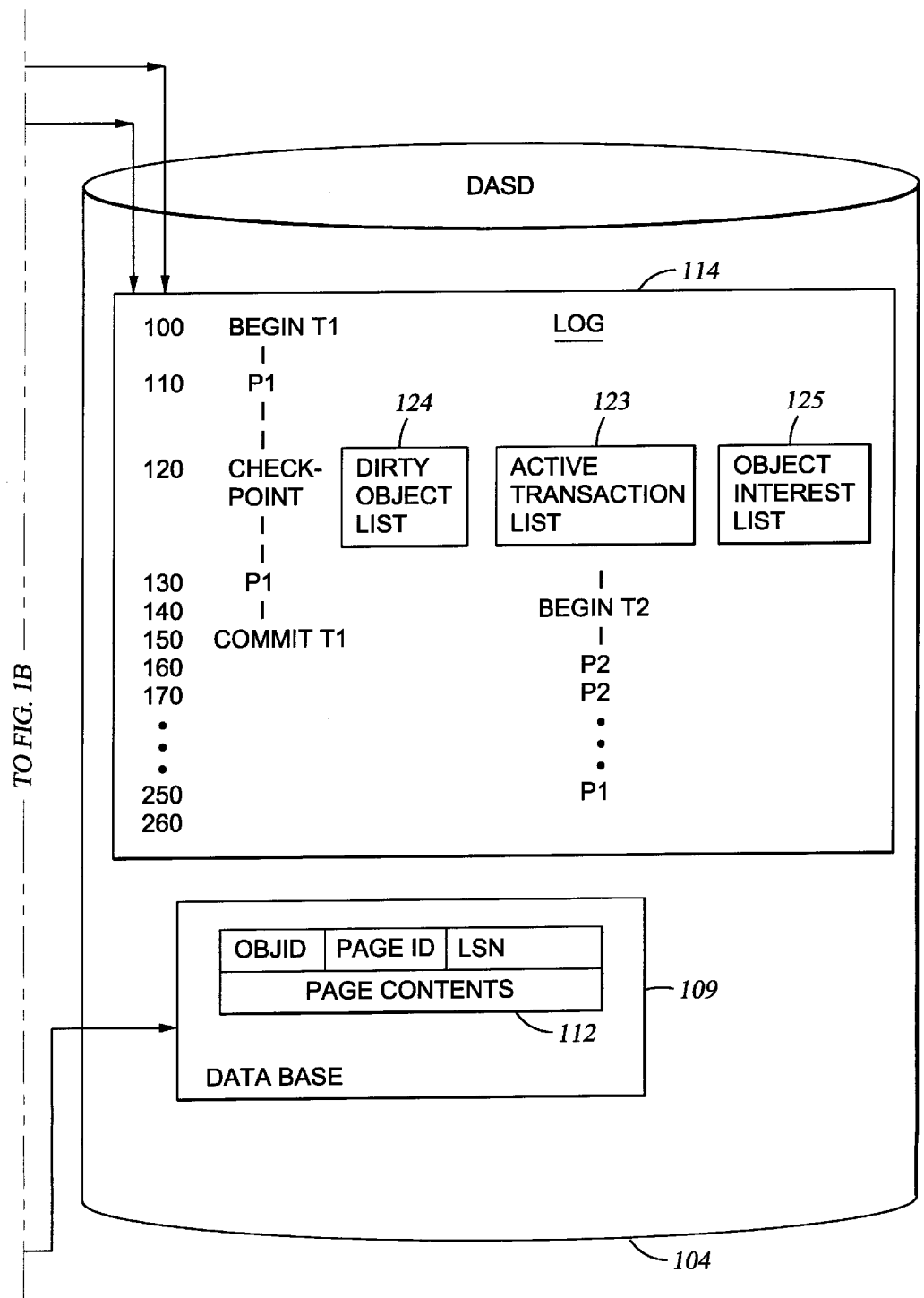

Refer to FIGS. 1A and 1B where a representative database management system (DBMS) 101 is coupled to a main memory 102 and to a non-volatile storage subsystem 104. Preferably, the non-volatile storage 104 is a direct-access-storage-device (DASD) comprising one or more disks. Such storage is also called stable storage because it remains intact and its contents are available in the face of failures such as logical errors, system errors, or system crashes. The DBMS 101 is conventional and can include almost any transaction-based system such as the SQL/DS, DB2 or IMS systems available from the assignee. (DB2 is a trademark of the assignee.) The DBMS 101 includes, among other components, a transaction manager TM 106 and a buffer manager BM 107. The DBMS 101 also includes a restart recovery mechanism 108 with REDO and UNDO components.

The non-volatile storage 104 shown in FIG. 1B stores data structures which are accessed through the DBMS by transactions, two of which are indicated by T1 and T2. The data structures may be contained in a database 109 in the non-volatile storage 104 and comprise pages such as page 112. A transaction requests, through the TM 106, access to a page for transaction processing. The request is passed to the BM 107 which operates a buffer pool in the main memory 102 into which pages are staged from the database 109 for access by executing transactions. A copy 113 of the page 112 is shown in FIG. 1 residing in the memory 102.

The transaction manager 106 maintains a write-ahead log 114 in the storage subsystem 104. The log 114 is conventional in all respects. In this regards, the transaction manager of the DBMS 101 ensures that, for any transaction which alters a page, a sequence of actions causing the alteration is recorded. As an example, log records for two transactions, T1 and T2, are shown recorded in the write-ahead log 114. The log records for each transaction are entered into the log 114 in a sequence, with each record being assigned a log sequence number corresponding to its place in the sequence. The log sequence numbers (LSNs) are assigned in a monotonically increasing sequence. LSNs are usually logical addresses of corresponding log records but can also comprise version numbers or timestamps.

The sequence of log records for transaction T1 is shown in FIG. 1B where a transaction began with a BEGIN T1 log record at LSN 100, an update to page P1 at LSN 110, another update to P1 at LSN 130, and a commit T1 record at LSN 150. Transaction T2 is described in a record sequence beginning at LSN 140 and showing updates at LSNs 160, 170 and 250.

As is typical in a transaction-based system, a check-point is periodically taken of the status of transactions. The check-point information is entered in the write-ahead log (log) 114 and assigned the LSN for its place in the sequence. Two components of a check-point log record of particular interest in this invention are transaction statuses and dirty object LSNs, both obtained from status information maintained by the transaction manager (TM) 106 and buffer manager (BM) 107 during transaction processing.

The TM 106 maintains a list of active transactions and their dispositions (in-commit, in-flight, in-abort, etc.) 121. For example, the active transaction list 121 shows two in-flight transactions, transaction 100 (T1) and transaction 140 (T2). As is common practice, transactions are identified by the LSN of their Begin Transaction log records. At a later time, after transaction T1 commits but before transaction T2 does so, the list would show only one in-flight transaction (T2). At check-point time, the list is copied to an area 123 of the check-point log record of log 114.

The BM 107 maintains a dirty object list 118 as shown in FIG. 1A. In this regard, a "dirty object" is an object that has a page staged into the memory 102 from the non-volatile storage 104 and modified, but not yet written back to the storage 104. During normal processing, when a page is staged from the storage 104 into the memory 102 and is subsequently modified, the identification of the page's object may be entered into the dirty object list 118 together with the current end-of-log LSN (DLSN) which will be the LSN of some future log record. The entry in the dirty object list is made if the object is not already dirty. The value of DLSN indicates from what point in the log there may be updates which are possibly not yet in the non-volatile storage version of the object. Whenever an object no longer has dirty pages (the pages have been staged back to non-volatile storage 104), the object's entry in the dirty object list is removed. If later the object is dirtied again, then the object will be re-entered into the dirty object list. At check-point time, the dirty object list is copied to a dirty object list area 124 of the check-point log record contained in log 114.

In accordance with this invention, the TM 106 also maintains an object interest list (OIL) 122 in memory 102 which tracks active transactions and the object or objects each transaction has updated. Each OIL entry identifies a transaction, the objects updated by the transaction, and for each such object, the LSN of the first log record written to describe an update of the object by the transaction. In the preferred embodiment, a copy of the OIL is put in an object interest list 125 area of the check-point log record at check-point time. What is pertinent is not the fact that the OIL is check-pointed, but the fact that the OIL is maintained and is available at restart recovery time.

Thus, assume that the transaction T1 requests access to a record on page 112 of database 109 and that the page is not in storage 104. The request is forwarded by the TM 106 to the BM 107, which stages the page in the non-volatile storage into the main memory 102. In one embodiment, the structure of the page includes at least three identification and status fields and the contents of the page. The first field may contain an identification of the object (OBJID) to which the page belongs. A second field contains the identification of the page (PAGE ID). A third field contains the LSN of the log record recording the last update made to the page.

When the page 112 is staged from the non-volatile storage 104 into the main memory 102 and is about to be modified, a corresponding entry is made into the dirty object list 118 if the object is not already dirty (i.e., if the object does not already have a page in main memory 102 containing changes not reflected on the version of the page in non-volatile storage 104). Assume that the page 112 corresponds to the page P1 identified in the log records as LSN 110 for transaction T1 and that its contents have been updated from "page contents" to "page contents." The updated page is identified by reference numeral 113 in the memory 102. Assume that the updates corresponding to LSNs 110 and 130 are made to the page. When the first of these updates is made, a corresponding entry is made in the active transaction list 121. The entry consists of the transaction ID of the transaction (typically the LSN of the Begin Transaction log record, BTLSN) and an annotation indicating the transaction is in-flight. An entry is also made in the OIL 125. Assume that page P1 is a component of file F1; the OIL 125 entry for T1 will indicate that F1's first update by T1 is described by the log record with LSN 110. (If T1 updated additional files, there would be additional files and LSNs identified in T1's OIL entry, but in our example T1 modifies only a single object, F1). Later, the updates made to P1 by T1 are committed, as indicated LSN 150 as shown in log 114 of FIG. 1B. At this time, the entry for T1 in the active transaction list 121 and in the OIL 122 are removed, however, file F1 remains in the dirty object list until page P1 is returned to the non-volatile storage 104. (The assumption here is that P1 is the only page causing F1 to be in the dirty object list.)

Assume now that a failure occurs when the LSN sequence in log 114 has advanced to 260 and that the last check-point occurred at LSN 120. Assume further that the updates made by T1 to P1 have been recorded on the updated log 114 in the non-volatile storage 104. Further, at the point of failure, T2 is in-flight, having had none of its udpates committed.

When failure occurs, a restart recovery mechanism 108 is invoked. This mechanism, using the log records and backward chained LSNs either automatically restarts the DBMS 101 in response to the failure, or waits for a user command to restart. In general terms, discussed in greater detail with respect to the method of the invention below, the recovery mechanism makes an ANALYSIS pass through the log from the last check-point forward. During this pass, the mechanism acquires information about dirty objects and about in-flight, in-doubt and completed transactions. The dirty object information provides a starting point from which the REDO of the recovery mechanism 108 may re-establish the state of the database as of the time of the system failure by processing log records for all transaction updates from the REDO starting point up to the point of failure. The REDO pass also acquires necessary locks for protecting uncommitted updates of transactions which were in the in-doubt state at the time of failure. During a first UNDO pass, the recovery mechanism 108 rolls back some of the updates of in-flight transactions as described below. In a later UNDO pass, remaining updates of in-flight transactions are rolled back. For transactions which were rolling back when the failure occurred, the UNDO phases of recovery mechanism 108 rolls back only updates which have not already been undone.

Despite the foregoing description, ordinarily skilled artisans having the benefit of this disclosure will recognize that the apparatus discussed above may be implemented in a machine of different constructions without departing from the scope of the invention.

Operation

In addition to the various hardware embodiments described above, a different aspect of the invention concerns a method for recovering shared databases using the present invention.

In one embodiment, the method blocks transactions from accessing data that has restart recovery work pending. A transaction is a program unit whose execution preserves the consistency of a database. For example, if before a transaction executes a database is in a consistent state then, once it completes its execution, the database should remain in a consistent state. A transaction is a program unit that assesses and possibly updates various data items contained in a database.

Transactions

Figure 2:
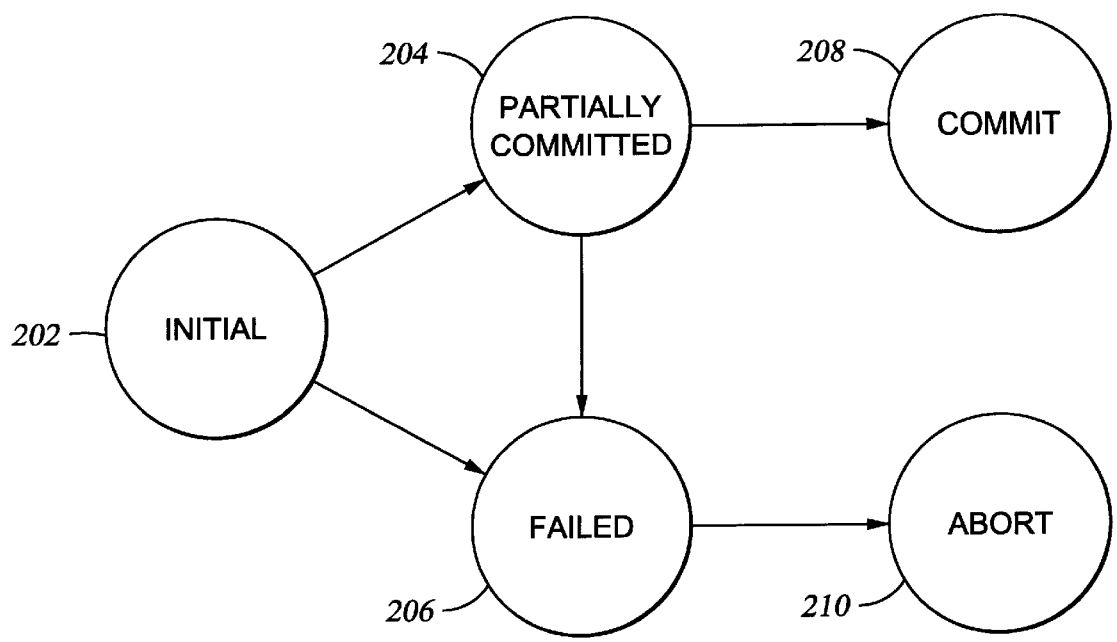
FIG. 2 is a block diagram showing a prior art procedure commonly followed in committing updated data to a database.

As reflected in FIG. 2, a transaction block diagram is shown. A transaction starts in the initial (in-flight) state 202. When it reaches its last statement it enters a partially committed state 204. At this point, the transaction has completed its execution, but it is still possible that it may have to be aborted. In the preferred embodiment of the present invention, writes to storage take place only after a transaction has entered the commit stage as shown in task 208. As discussed above, one way to implement such a scheme is to store any value associated with such writes to storage temporarily in a nonvolatile storage, and to perform the actual writes only at commit time 208. A committed transaction will then be able to complete its write except in the case of hardware storage failures.

The transaction enters the failed state 206 after it is determined that the transaction cannot proceed with normal execution, for example, due to hardware or logical errors or due to user request. In this case, the transaction must be rolled back. Once a rollback has occurred, the transaction enters the aborted state 210.

REDO/UNDO

Figure 3:
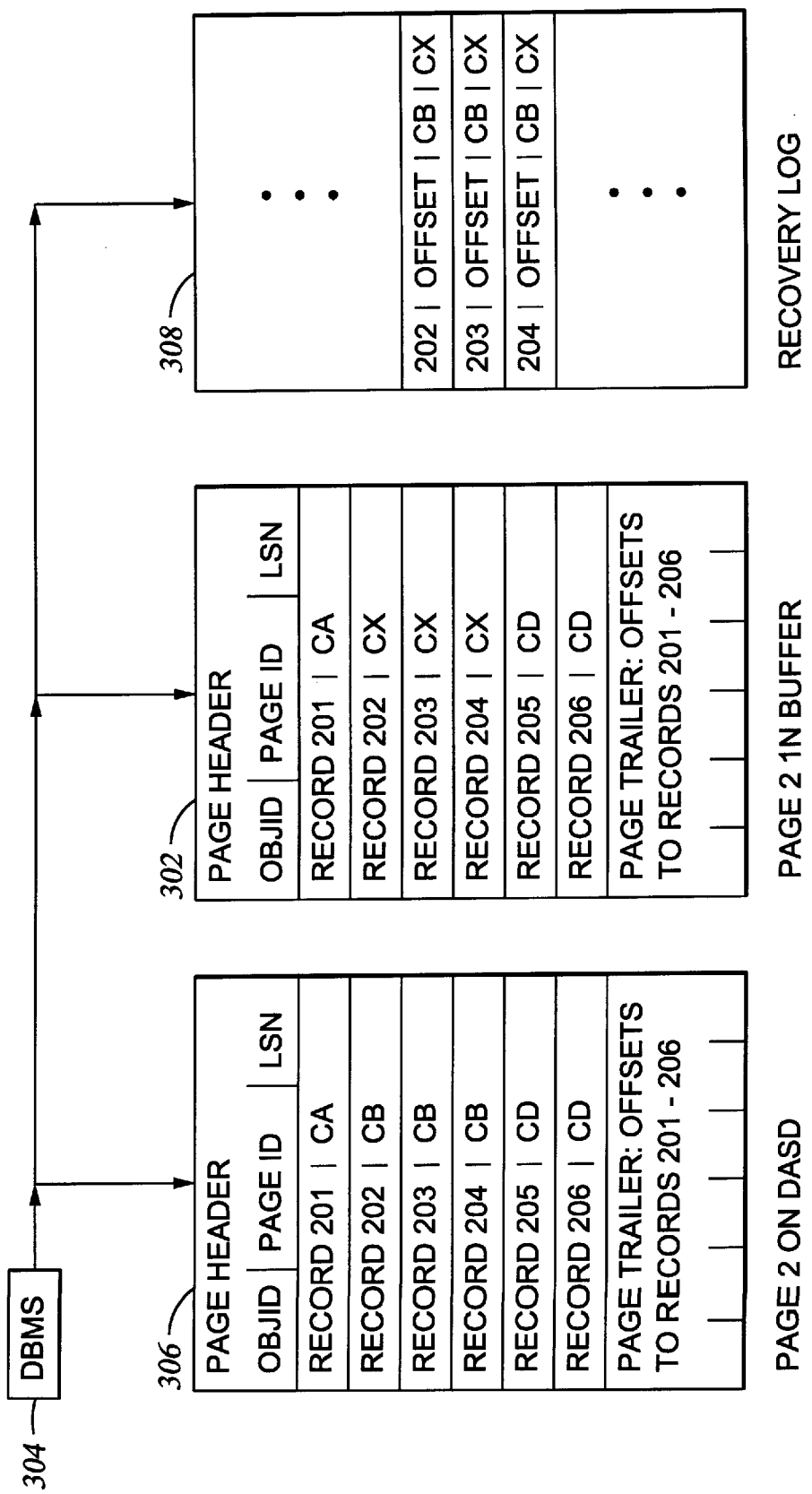
FIG. 3 is a block diagram illustrating details of a database management system including UNDO and REDO methods used in one embodiment of the present invention.

A more detailed example of REDO and UNDO operations practiced in one embodiment of the current invention is illustrated in FIG. 3 where a recovery process performs "forward" recovery using the REDO records of a recovery log 308. As an example, assume that records identified by record numbers 201–206 are included on data page 2 which is included in a data set stored in stable storage 306. Assume next a transaction against records 202–204, and that the records are to be updated as a result of the transaction. For updating the records, the DBMS 304 transfers the page to a buffer 302 in memory, where the records 202–204 are updated in each case by changing record data CB to CX.

During the processing of these records, log entries are made in the sequence in which the records were updated. Each record update results in the writing of an UNDO/REDO record to a transaction recovery log 308. For example, the transaction recovery log 308 entry for updating record 202 includes a field identifying the record (202), a field containing the offset within the record to the data change, an UNDO field containing the old data value (CB), and a REDO field containing the new data value (CX). Assuming failure occurs after the updates to records 202–204 have been committed, but before the changes were staged to stable storage, restart recovery processing will retrieve the version of the page that is on stable storage into memory and then use the REDO portion of the recovery log 308 records to update records 202–204. The DBMS 304 will then write the buffer page back to stable storage. Forward and backward recovery functions are available in database products manufactured by the IBM Corporation, assignee of the present invention. For example, forward and backward recovery are supported in the database manager of the IBM DB2 and IMS/ESA program products.

Overall Sequence of Method Operation

Figure 4A:
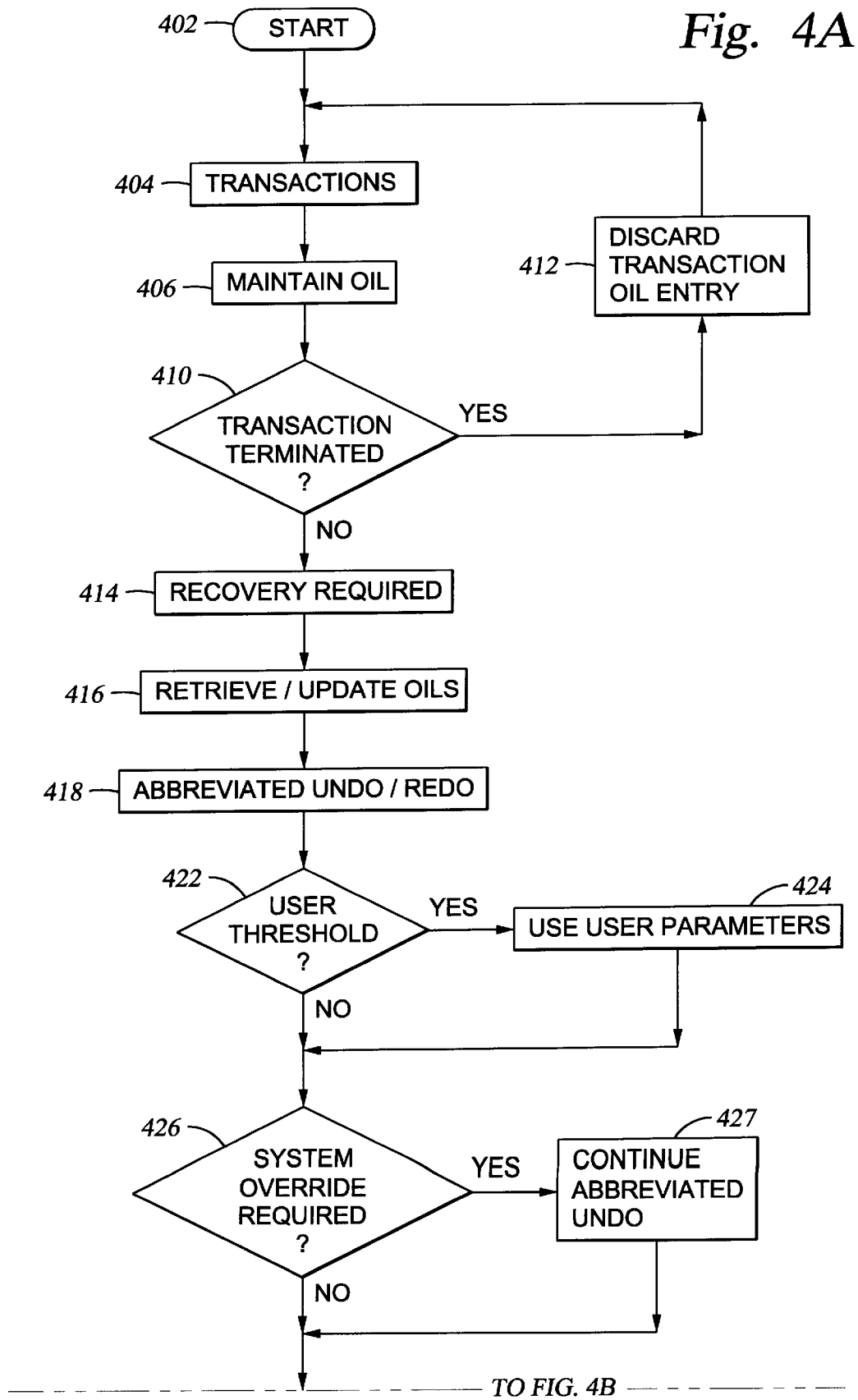
FIG. 4A and 4B are a flowchart of an operational sequence for a DBMS restart recovery method that provides system availability during the recovery process.
Figure 4B:
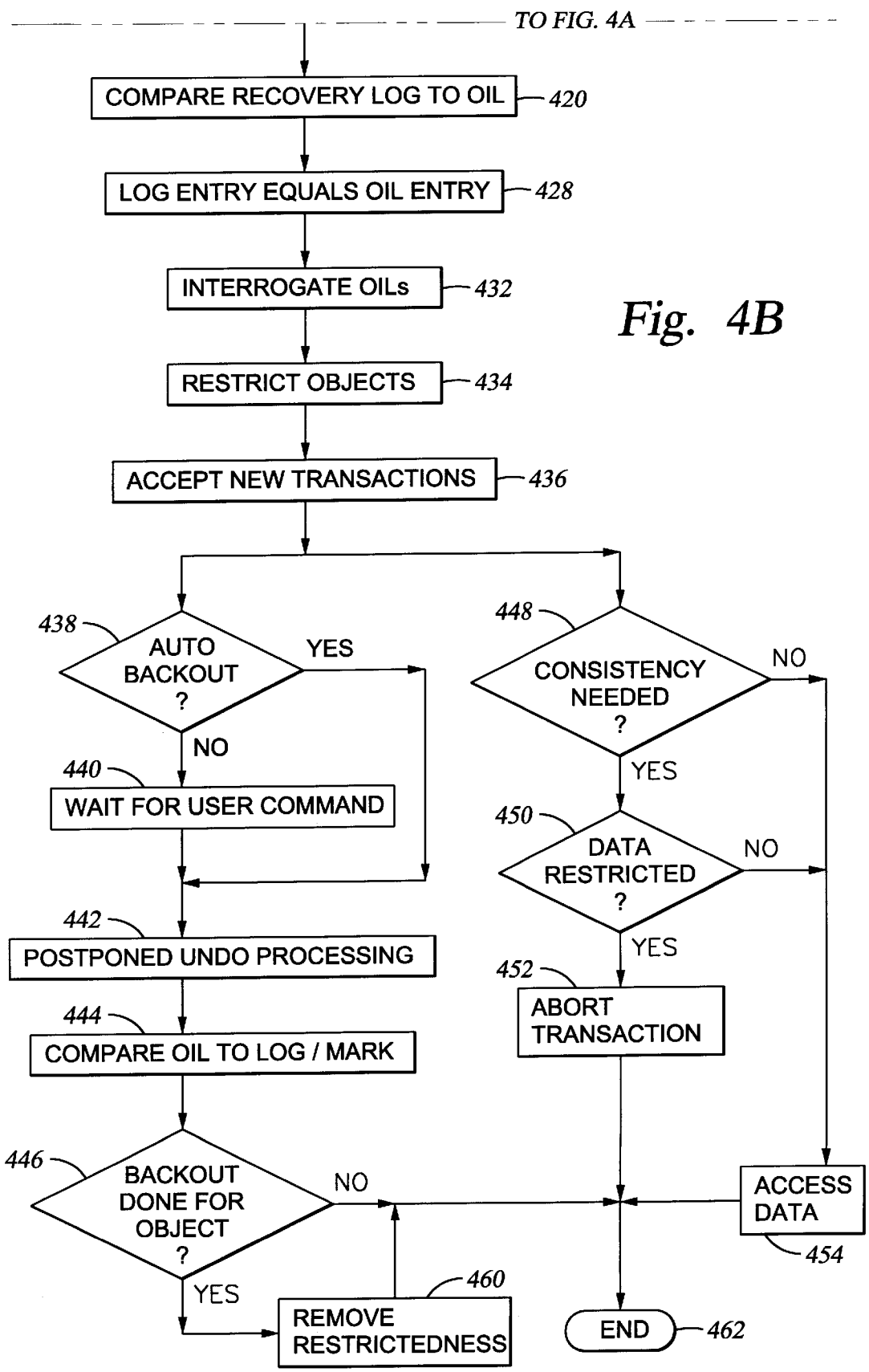

FIGS. 4A and 4B show a sequence of method steps to illustrate one example of the method aspect of the present invention. For ease of explanation, but without any limitation intended thereby, the example of FIGS. 4A–4B are described in the context of the apparatus 100 described above. Further, the use of the singular "a" or "an" throughout the application, such as "a record", is meant to refer to singular or multiple implementations and is only used for clarity purposes. This singular article is not intended to limit the application to singular elemental embodiments.

The steps are initiated in task 402, when transactions processed by the apparatus 100 (system) effect the objects contained in the system's logs and database. An object may be anything that exists in and occupies space in storage or a log and on which operations may be performed, for example, data or programs. These transactions may represent new data received by the system in which the current data held in the database is no longer current. The system tracks these transactions and monitors the state of a transaction during regular system operation and across system failures. For example, a transaction which is in-flight, in the commit stage, or which is in a stage whose outcome will affect the system's database is monitored.

During the processing of these transactions in task 404, the system also maintains an object-interest-list (OIL) for each active transaction. The OIL records maintained in task 406 track the object the transaction is attempting to update or has updated. In one embodiment, maintaining the OIL includes tracking a transaction's update interest at the table space partition level, where a table space is a page set used to store the records of one or more tables of data.

In any case, each entry in a transaction's OIL identifies an object partition which either will be or has been updated by the transaction. An entry is made to a transaction's OIL each time the transaction updates a new object. In one embodiment, an OIL is check-pointed at system check point times. Check-pointing refers to a point at which information about the status of transactions and the system can be recorded so that the DBMS can be later restarted. In one embodiment, check-pointing includes writing an OIL to the log 114 as shown in FIG. 1B. Maintaining an OIL allows each entry to be available for access during restart recovery processing. As discussed further below, a transaction's OIL entry is discarded in task 412 if a transaction is terminated in task 410. A transaction terminates when it completes a processing operation, for example, a commit or abort process.

If the transaction is not terminated in task 410, the transaction and the effects of the transaction on the database may require restart recovery in task 414 if a system failure has occurred before the transaction was committed. During system restart, OILs are brought up to data as of the point in time the failure occurred. In one embodiment, the OILs are retrieved from the last system check-point log records in task 416, and are then updated to the point in time of the failure as part of a forward log apply process discussed above. Each entry on an OIL is cross-chained with other entries on the OIL to facilitate determination of all objects updated by a given transaction, and of all transactions that updated a given objects.

After the OILs have been retrieved in task 416, the method of the present invention enters REDO and UNDO processing in task 418. REDO processing is only performed if necessary, and UNDO processing is only performed in an abbreviated manner. In one embodiment, this initial UNDO phase may be null. In any event, UNDO processing is not initially fully completed; UNDO processing is prematurely terminated before all backout work is done as explained below.

In one embodiment, the degree of abbreviation of UNDO processing is determined by a user-supplied threshold in task 422. The user specifies the threshold as the number of log records to be processed during the UNDO phase. Upon completion of that amount of UNDO work, the system discontinues backout processing and begins accepting new transactions. If a user threshold is not preferred in task 422, then a system default threshold is used. Whether a user-supplied or system default threshold is used, however, the system may over-ride the threshold in task 426.

This system over-ride provides the system the ability to over-ride the selected threshold and perform additional backout work if it deems it necessary to complete backout processing for critical system objects. One example of a critical system object is a data set that is required by the DBMS to manage the system recovery. if a system over-ride is initiated, then abbreviated UNDO is continued in task 427. For every log record processed during the UNDO phase, it is determined whether the recovery log record for a given transaction represents a first UNDOable update made by the transaction against the object to which the log record applied. In one embodiment, the level of object granularity associated with a log record may be that of table space partitions. It should be understood that the level of partition may be tuned depending upon the needs of the system in which the invention is implemented and other object granularities may be used.

Regardless of the granularity used, each UNDO recovery log record is compared to the appropriate OIL entry in task 420. If the recovery log record represents the transaction's first undoable update to the object, then the OIL entry is designated as completed or "backout done" in task 428. This designation indicates that the given transaction has no more backout work to perform against the given object.

After the OIL entries, if any, have been designated in task 428, the OILS are interrogated in task 432. For each data object, if there remains a transaction with update interest in that object and that object's backout work has not been completed, the object is placed in a restricted state in task 434. This restrictive state allows postponed restart processing discussed below to access the object, but prevents new transactions from accessing the object if the transaction requires consistent data. In task 434, the action taken against OILs during the recovery may or may not be logged as they occur. Regardless, the contents of the OILs are copied to the recovery log, or by some other means made available to subsequent restarts. This is referred to as "hardening the OILS." Copying actions taken against the OILs to the recovery log during restart is necessary for status rebuild should another system failure strike before postponed backout processing is accomplished. The system of the present invention also includes the tracking of transactions and their state at any point in time—such as whether the transaction is in flight, committed, in commit, etc.—across system failures.

In one embodiment, hardening of the OILs may occur as part of the normal system check-point taken by the system after objects, if any, are restricted in task 434. In the preferred embodiment, check-points used in the invention capture the identity of all active transactions. A transaction may be a group of changes made to database files that appear to the system to be a single change but that require multiple operations by the application program. An active transaction is a transaction that has not completed the multiple operations as explained in relation to FIG. 2.

Following task 434, the system is able to accept new transactions for processing. The processing of new transactions proceeds in parallel with postponed UNDO processing. New transactions received in task 436 that require data consistency may access all objects other than those which have been restricted in task 434 and not yet unrestricted in task 460. For such transactions, a determination is made as to whether the object requested by the transaction is in a restrictive state in task 450. If so, the transaction is aborted in task 452 and processing for that transaction ends. If not, data access is allowed 454. The consistency check of task 448 and restrictiveness check of task 450 are made for every data access made by the transaction until the transaction ultimately completes in task 462. New transactions received in task 436 that do not require data consistency simply access objects 454 without checking the object's restrictedness.

Postponed UNDO processing occurs in parallel with the processing of new transactions. It may be initiated automatically by the system in task 438 if the user has configured the system to behave in this manner. If not, the postponed UNDO processing will wait for a user command in task 440 before beginning.

Regardless, postponed UNDO processing begins in task 442. Postponed UNDO processing causes all pending backout work in task 418 to be completed. The postponed processing in task 442 picks up where the abbreviated UNDO processing of task 418 left off. In task 444, the OIL entry is compared to the recovery log record being processed and it is determined whether the recovery log record represents the first UNDOable update made by a transaction against the data object to which the recovery log record applies. Again, the update interest level may be as discussed above. For example, in one embodiment, the LSN of the recovery log record may be compared to that recorded in the appropriate OIL entry for the appropriate transaction. If the recovery log record does represent the transaction's first update to the object, the appropriate OIL entry is designated as complete once the log record's undo processing is performed. This indicates that the given transaction has not more backout work to perform against the object.

If the processing of the recovery log record results in all pending backout work against the object being completed in task 446, the restrictive state of the object is lifted in task 460 and the object becomes accessible to all new transactions that enter the system in task 436. When backout completes for a whole transaction, the transaction's OIL is discarded, the transaction is completed, and the method ends in task 462.

If the object requested by a transaction has not yet had undo work completed (i.e., it is still in a restrictive state), then access to data is only allowed in task 454 for transactions that so not require consistent objects task 448. If a consistent object is required but the object is in a restrictive state, the transaction is denied access and terminated in task 452. Examples of transactions that do not require consistent data are ISO(UR) transactions in DB2 for OS/390 or ISO (NC) transactions in DB2 for AS/400. When accessing restricted data, the transaction and system must be able to tolerate physical inconsistencies in the database.

Signal-Bearing Media

Such a method may be implemented, for example, by operating the apparatus 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to recover shared databases.

Figure 5:
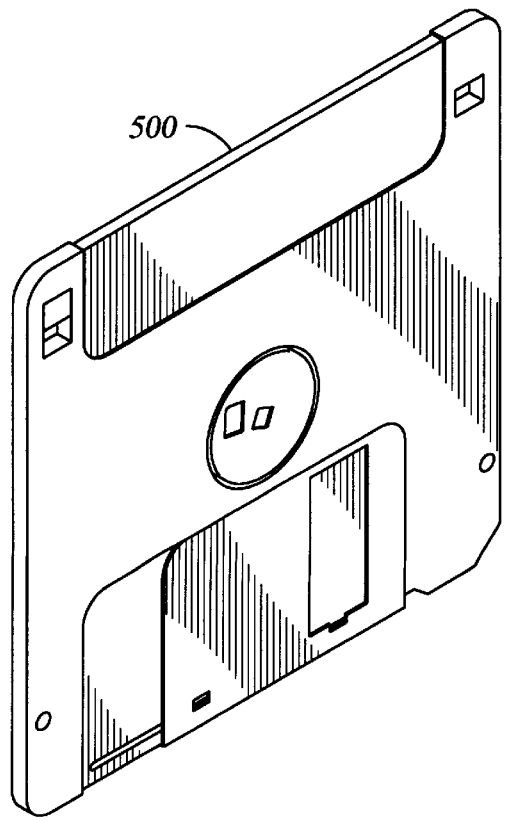
FIG. 5 is a perspective view of an exemplary signal-bearing medium in accordance with the invention.

This signal-bearing media may comprise, for example, RAM (not shown) contained within the apparatus 100. Alternatively, the instructions may be contained in another signal-bearing media, such as a magnetic data storage diskette 500 shown in FIG. 5 and directly or indirectly accessible by the apparatus 100. Whether contained in the apparatus 100 or elsewhere, the instructions may be stored on a variety of machine-readable data storage media, such as DASD storage (e.g., a conventional "hard drive" or a RAID array), magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiments of the invention, the machine-readable instructions may comprise lines of compiled C, C++, or similar language code commonly used by those skilled in the programming for this type of application arts.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for providing system availability during recovery of a database, comprising:
    performing abbreviated UNDO processing of objects in a database such that new transactions are not accepted, the abbreviated UNDO recovery processing comprising:
        receiving user-supplied thesholds including a number of log records to process during UNDO recovery processing;
        determining whether a log record entry represents a first undoable update made by a transaction to an object to which the log record applies, and if the log record represents the transaction's first update to the object; and designating a corresponding interest entry as complete, thereby indicating that the transaction has no further UNDO recovery processing required for that object;

restricting an object from transaction access based upon selected criteria, wherein unrestricted objects remain available for transaction access;

accepting new transactions;

maintaining an interest list, the interest list used to track objects affected by a transaction;

making entries to the interest list accessible during recovery processing;

waiting until REDO recovery processing, if any, has completed before performing abbreviated UNDO recovery processing;

restricting an object from transaction access including:
  restricting any object reference in the interest list from transaction access based upon the selected criteria, wherein unrestricted objects remain available for transaction access; and
  restricting transaction access to an interest list entry's object if there remains a transaction with update interest in the object and UNDO recovery processing has not been completed on that object;

performing further UNDO recovery processing by:
  determining whether a log record entry represents a first undoable update made by a transaction to an object;
  if the log record represents the transaction's first update to the object, designating a corresponding interest list entry as complete, complete indicating that the transaction has no further UNDO processing required for that object; and
  removing an object's restriction if UNDO work against the object has been completed; and copying the interest list to a log at a system check-point time.

2. The method of claim 1, further comprising automatically overriding the user-specified thresholds if additional UNDO recovery processing of critical objects is necessary.

3. The method recited in claim 2, including delaying further UNDO recovery processing until a user command to continue is received.

4. The method in claim 3, further comprising:
  retrieving the interest list from a log updated at a last system check-point time; and
  updating the interest list to a point in time when system failure occurred using forward log apply recovery processing.

5. The method recited in claim 4, including logically linking interest list entries.

6. The method recited in claim 5, wherein access by a transaction to a restricted object is allowed if the transaction can accept inconsistent data.

7. The method recited in claim 6, further comprising logging interest list changes that occur during recovery processing to a recovery log.

8. A signal bearing medium tangibly embodying a program of machine-readable instructions executable by a digital processing apparatus to perform a method for providing system availability during recovery of a database, said method comprising:
  maintaining an interest list, the interest list used to track objects affected by a transaction;
  making entries to the interest list accessible during recovery processing;
  waiting until REDO recovery processing, if any, has completed;
  performing abbreviated UNDO recovery processing such that new transactions are not accepted the abbreviated UNDO recovery processing comprising:
    receiving user-supplied thresholds including a number of log records to process during UNDO recovery processing;
    determining whether a log record entry represents a first undoable update made by a transaction to an object to which the log record applies, and if the log record represents the transaction's first update to the object; and
    designating a corresponding interest entry as complete, thereby indicating that the transaction has no further UNDO recovery processing required for that object;
  restricting any object referenced in the interest list from transaction access based upon the selected criteria wherein the selected criteria comprises restricting transaction access to an interest list entry's object if there remains a transaction with update interest in the object and UNDO recovery processing has not been completed on that object;
  accepting new transactions; and
  performing further UNDO recovery processing, including;
    determining whether a log record entry represents a first undoable update made by a transaction to an object;
    if the log record represents the transaction's first update to the object, designating a corresponding interest list entry as complete, complete indicating that the transaction has no further UNDO processing required for that object;
    removing an object's restriction if UNDO work against the object has been completed; and
  copying the interest list to a log at a system check-point time.

9. The medium recited in claim 8, the method further comprising automatically overriding the user-specified thresholds if additional UNDO recovery processing of critical objects is necessary.

10. The medium recited in claim 9, the method further comprising delaying further UNDO recovery processing until a user command to continue is received.

11. The medium recited in claim 10, the method further comprising:
  retrieving the interest list from the log updated at a last system check-point time; and
  updating the interest list to a point in time when system failure occurred using forward log apply recovery processing.

12. The medium recited in claim 11, the method further including logically linking interest list entries.

13. The medium recited in claim 12, the method further comprising access by a transaction to a restricted object is allowed if the transaction can accept inconsistent data.

14. The medium recited in claim 13, the method further comprising logging interest list changes that occur during recovery processing to a recovery log.

15. An apparatus used to provide system availability during recovery of a database, the apparatus comprising:
  non-volatile storage;
  memory;

a processor, the processor executing commands to recover the database while providing system available by:
  maintaining an interest list, the interest list used to track objects affected by a transaction;
  making entries to the interest list accessible during recovery processing;
  waiting until REDO recovery processing, if any, has completed;
  performing abbreviated UNDO recovery processing such that new transactions are not accepted the abbreviated UNDO recovery processing comprising:
    receiving user-supplied thresholds including a number of log records to process during UNDO recovery processing;
    determining whether a log record entry represents a first undoable update made by a transaction to an object to which the log record applies, and if the log record represent the transaction's first update to the object; and
    designating a corresponding interest entry as complete, thereby indicating that the transaction has no further UNDO recovery processing required for that object;
    restricting any object referenced in the interest list from transaction access based upon the selected criteria wherein the selected criteria comprises restricting transaction access to an interest list entry's object if there remains a transaction with update interest in the object and UNDO recovery processing has not been completed on that object;
  accepting new transactions; and
  performing further UNDO recovery processing, including;
    determining whether a log record entry represents a first undoable update made by a transaction to an object;
    if the log record represents the transaction's first update to the object, designating a corresponding interest list entry as complete, complete indicating that the transaction has no further UNDO processing required for that object;
    removing an object's restriction if UNDO work against the object has been completed; and
  copying the interest list to a log at a system check-point time.

16. The apparatus recited in claim 15, the processor executing commands to automatically override the user-specified thresholds if additional UNDO recovery processing of critical objects is necessary.

17. The apparatus recited in claim 16, the processor executing commands to delay further UNDO recovery processing until a user command to continue is received.

18. The apparatus recited in claim 17, the processor executing commands for:
  retrieving the interest list from the log updated at a last system check-point time; and
  updating the interest list to a point in time when system failure occurred using forward log apply recovery processing.

19. The apparatus recited in claim 18, the processor executing commands to logically link interest list entries.

20. The apparatus recited in claim 19, the processor executing commands to restrict access to an object only if a transaction cannot accept inconsistent data.

21. The apparatus recited in claim 20, the processor executing commands to log interest list changes that occur during recovery processing to a recovery log.

* * * * *